United States Patent [19]

Meshulam

[11] 4,429,758

[45] Feb. 7, 1984

[54] MOTORIZED CART

[76] Inventor: Eli Meshulam, 1108 E. Pico Blvd., Los Angeles, Calif. 90021

[21] Appl. No.: 296,317

[22] Filed: Oct. 15, 1981

[51] Int. Cl.$^3$ ............................................. B62D 51/04
[52] U.S. Cl. ........................... 180/19 R; 280/47.13 R
[58] Field of Search .................. 180/19 R, 19 S, 19 H; 248/129; 280/47.11, 47.1 E, 47.13, 63, 78, 200, 210; 414/490

[56] References Cited

U.S. PATENT DOCUMENTS

| 2,329,372 | 9/1943 | Hitch | 180/19.1 |
| 2,500,168 | 3/1950 | DuPont | 180/19.1 |
| 2,903,082 | 9/1959 | Marcus | 180/19.1 |
| 3,166,141 | 1/1965 | Shield et al. | 180/19.1 |

FOREIGN PATENT DOCUMENTS

| 743185 | 5/1953 | United Kingdom | 180/19.1 |
| 802810 | 10/1958 | United Kingdom | 180/19.1 |

Primary Examiner—Joseph F. Peters, Jr.
Assistant Examiner—Mitchell J. Hill
Attorney, Agent, or Firm—James E. Brunton

[57] ABSTRACT

A motorized hand cart or truck specifically adapted for use by one man in transporting bulky loads over rough and steep terrain of the type typically found in avocado and citrus groves. The cart is designed to be compact, light weight and easily manuverable. An important feature of the device is the provision of a differential gear assembly which permits the drive wheels of the device to rotate at different rates of speed so that positive driving traction can be maintained when the cart is moving over rough and uneven ground. Additionally, the cart is provided with removable lifting forks and the center of gravity of the machine is such that leverage principles can be used to lift loads supported on conventional pallets.

9 Claims, 11 Drawing Figures

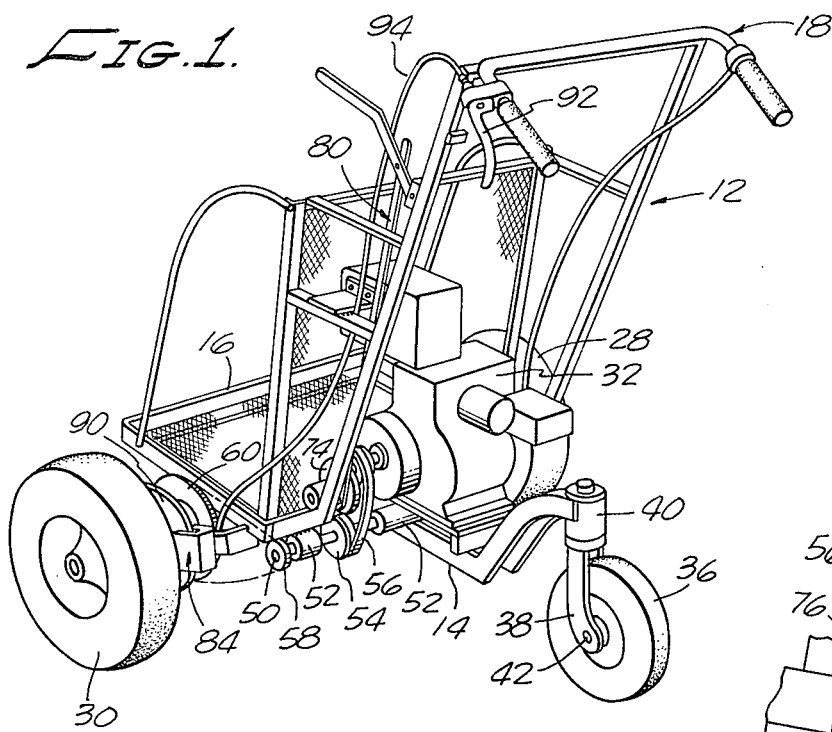
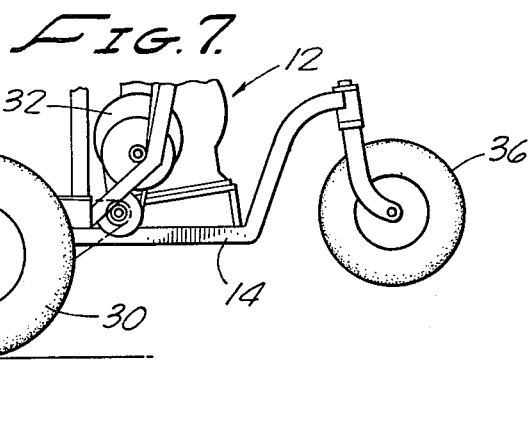

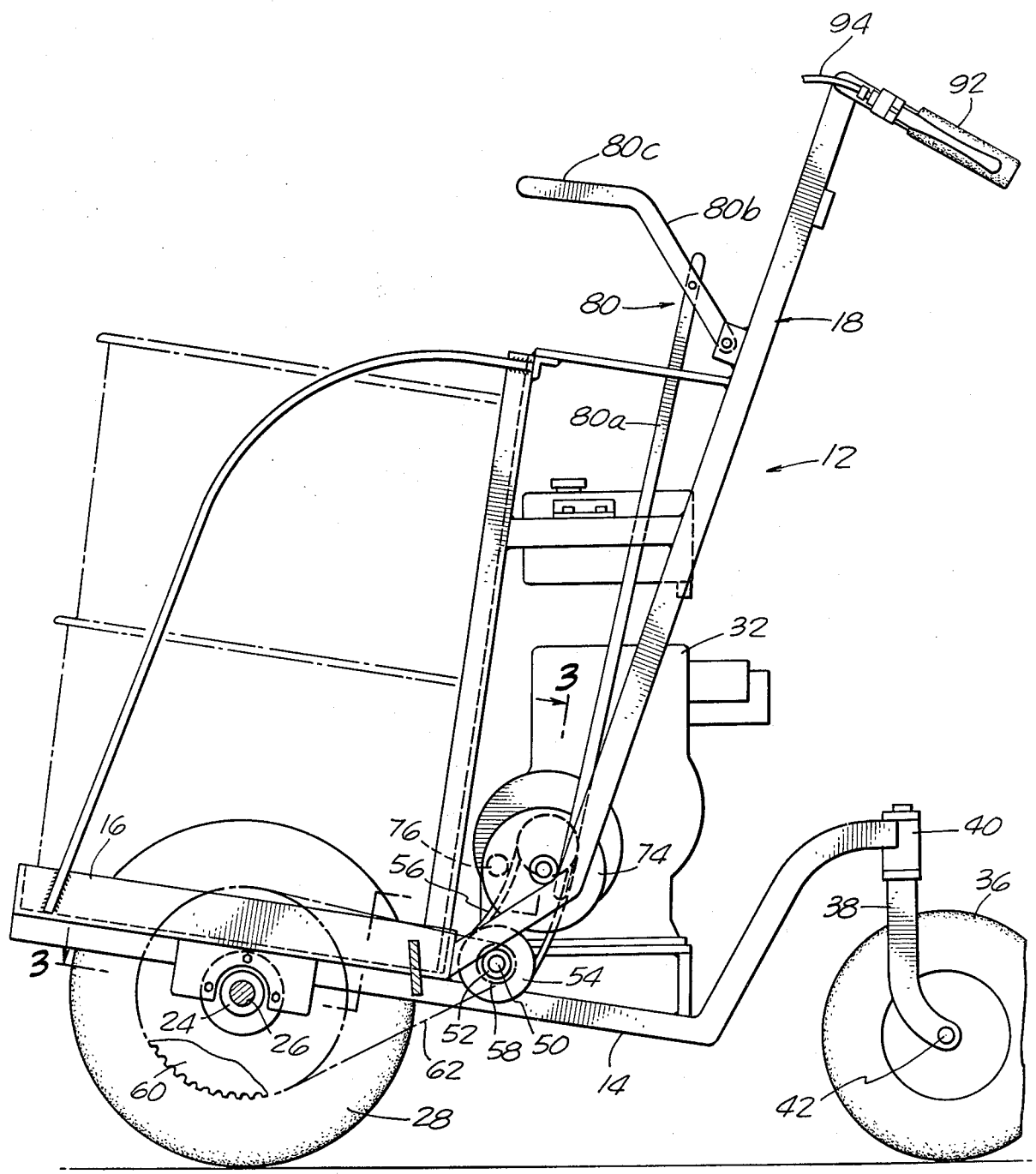

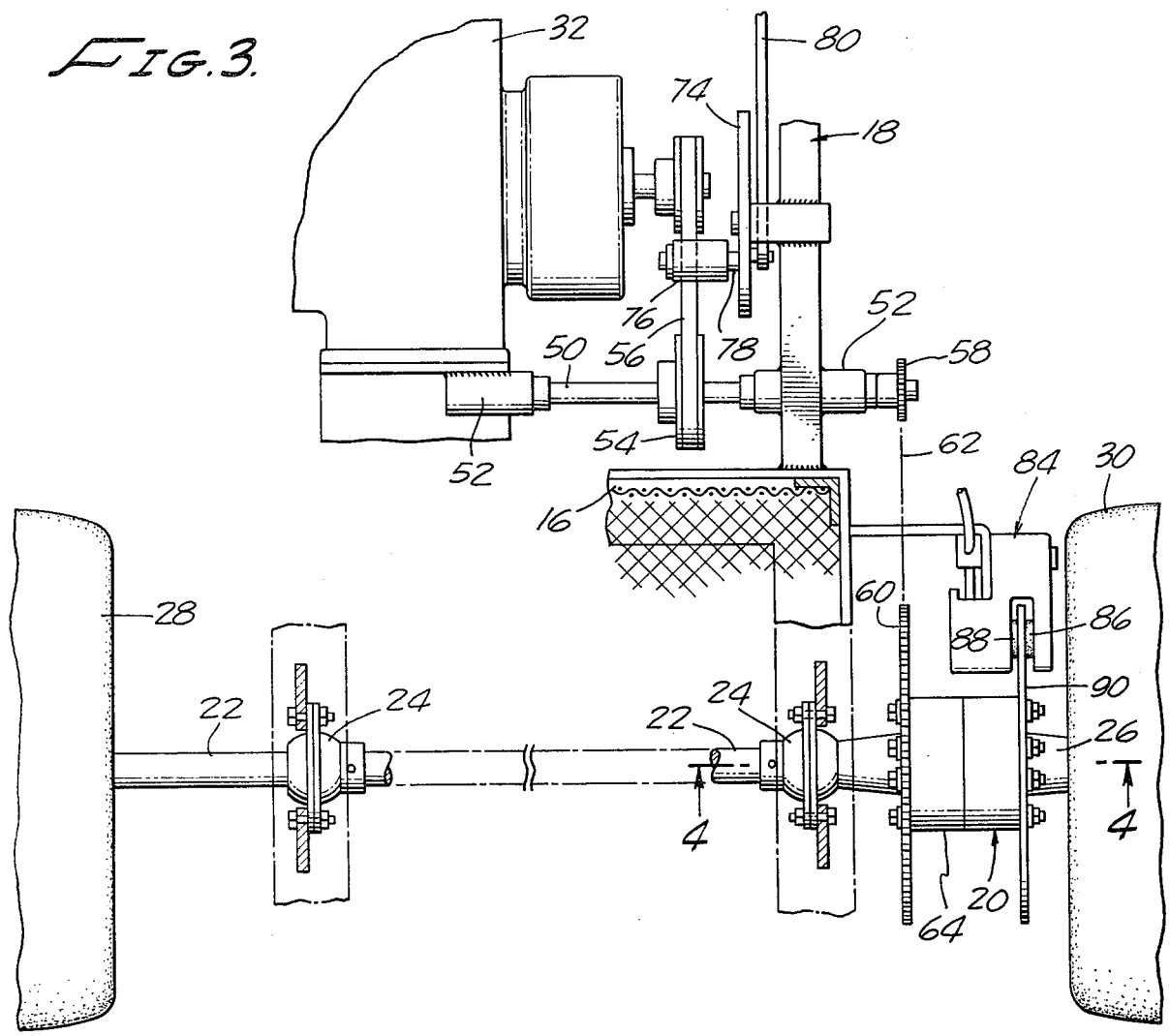
Fig. 3.
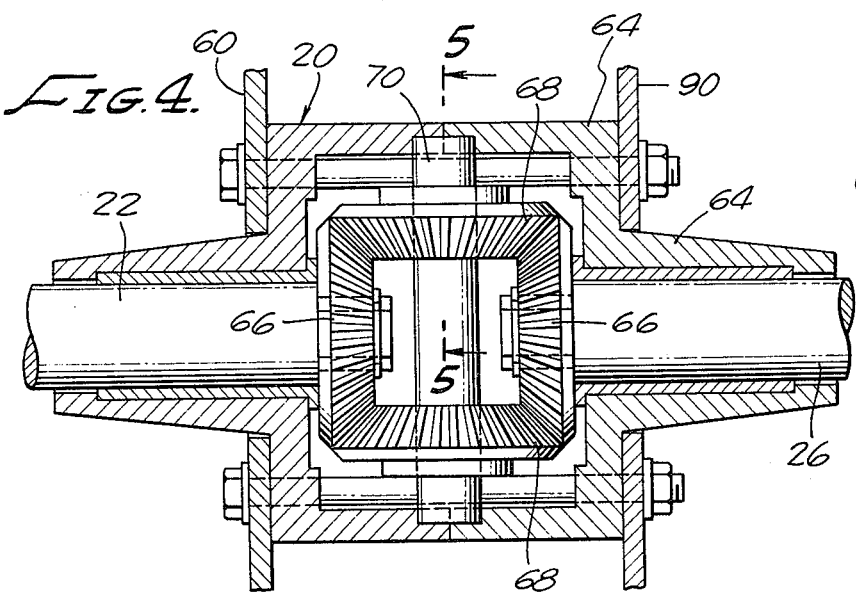
Fig. 4.
Fig. 5.

MOTORIZED CART

BACKGROUND OF THE INVENTION

1. Field of the Invention

The present invention relates generally to hand carts or hand trucks. More particularly the invention relates to a light weight, compact, motorized hand cart especially adapted for use in farming, ranching and like applications where bulky loads must be transported by one man over rough terrain.

2. Discussion of the Prior Art

Various types of manually operated two and four wheel hand carts have been suggested. Typically in using the prior art hand cart the operator lifts the load by utilizing the leverage principle. The upstanding handles of the cart comprise the lever which the operator, if lifting the load, pivots about an axis which is the axis of the forward axle of the cart. Once the load is elevated the handles are tipped rearwardly and the load is rolled on the cart wheels by means of an exertion of a pushing or pulling force by the operator.

While the prior art hand carts are quite satisfactory for use on relatively level, smooth surfaces, they are unsatisfactory for use on rough, sloping terrain of the type generally found in farming and particularly in avocado and citrus groves and the like. In point of fact, due to the sloping, uneven terrain of avocado groves, the use of any kind of prior art cart or tractor is virtually impossible. Therefore, the fruit after being picked is typically placed in lug boxes and the lug boxes are manually carried out of the grove by the pickers. This is strenuous and time consuming work.

The present invention, while useful in many applications, is specifically directed toward solving the problem of transporting lug boxes of fruit out of avocado and citrus groves. As a general rule, such groves are steep and uneven and fallen leaves and limbs make passage through the grove most difficult. Accordingly, a wheeled cart adaptable for use in such environs must be lightweight, stable and highly maneuverable. Additionally, in order for the cart to move beneath low hanging limbs, it must be quite compact. To negotiate the steep slopes of the grove while carrying several hundred pounds of fruit, the cart must also have superior traction, a powerful engine and a positive drive means. Additionally, in order to maintain traction, differential means must be provided to permit the drive wheels to rotate at different rates of speed.

Due to the unique design of the cart of the present invention, the center of gravity of the device is such that the leverage principle can also be used to transport loads carried on pallets. In this regard, removable forks can be mounted on the load platform of the device and by tilting the cart forwardly the forks can be inserted beneath a pallet or the like. When the handles of the cart are then tipped rearwardly the weight of the engine and drive means of the device counter balances the load and permits its effortless elevation. With the cart resting on the forward drive wheels and the rearward stabilizing wheels it is highly stable and can be easily moved from place to place with the engine positively driving the forward wheels.

Several attempts have been made to motorize hand carts. One such attempt is described in the patent to Tinker, U.S. Pat. No. 3,205,963 which patent represents the most pertinent art known to applicant. The Tinker invention is directed toward providing a means for converting a hand cart of standard construction into a motorized cart. While the Tinker device is a clear advance in the art, it obviously fails to meet the previously discussed requirements for a hand truck suitable for use in avocado and citrus groves and the like. However, as will become apparent from the description which follows, the present invention does in fact fully meet these requirements and, for the first time, provides a useful and practical device for carrying loads over rough, steep terrain such as is found in avocado and citrus groves.

SUMMARY OF THE INVENTION

It is an object of the invention to provide a light weight compact and readily maneuverable motorized cart for use by a single person in transporting bulky loads of several hundred pounds from place to place.

It is a particular object of the invention to provide a cart of the aforementioned character which is highly stable so that it can effectively be used in rough, sloping terrain such as is found in avocado groves and the like.

It is another object of the invention to provide such a motorized cart which is provided with a uniquely positioned gear differential so as to permit the driving wheels of the cart to turn at different rates of speed so that superior traction can be maintained when the cart is traveling over rough, rocky, and uneven ground.

It is a further object of the invention to provide a cart as described in the preceding paragraphs in which there is provided rearwardly disposed free running stabilizing wheels and in which the load carrying platform is strategically located to extend forwardly of the base frame and over the driving wheels so that when the platform is fully loaded the load will be effectively counterbalanced by the rearwardly disposed engine and driving mechanisms of the device. In this way the fully loaded cart is quite stable and there exists a minimum tendency for tipping in any direction.

It is still another object of the invention to provide a motorized cart of the class described in which the cart is pivotally movable about the axis of rotation of the driving wheels so as to lower the forward end of the loading platform to facilitate loading.

It is another object of the invention to provide a cart as described in the preceeding paragraph in which one or more lifting forks can be removably interconnected to the loading platform so that the cart can be used to lift loads resting on pallets and the like. With the forks in place the cart can be pivoted forwardly, the forks can then be inserted under the pallet and the load can be lifted by allowing the cart to rock rearwardly onto the rear stabilizing wheels.

It is yet another object of the invention to provide a cart as previously described which includes a five speed transmission so that the cart can be positively and controllably driven at various rates of speed depending upon the nature of the terrain being traversed.

It is a further object of the invention to provide a cart of the class described which is of simple construction and one which can be manufactured in volume at relatively low cost.

BRIEF DESCRIPTION OF THE DRAWINGS

FIG. 1 is a generally perspective view of one form of the motorized cart of the invention.

FIG. 2 is a enlarged, side elevational view of the motorized cart.

FIG. 3 is a cross-sectional view taken along lines 3—3 of FIG. 2.

FIG. 4 is a cross-sectional view taken along lines 4—4 of FIG. 3 showing the internal construction of the differential means of the invention.

FIG. 5 is a cross-sectional view taken along lines 5—5 of FIG. 4.

FIG. 6 is a fragmentary side elevational view of the clutch means of the invention illustrating the position of the component parts when the device is in a drive position.

FIG. 7 is a fragmentary side elevational view of the lower portion of the cart illustrating the interconnection therewith of fork means adapted for use in lifting loads carried on pallets and the like.

FIG. 8 is a cross-sectional view taken along lines 8—8 of FIG. 7.

FIG. 9 is a fragmentary side elevational view similar to FIG. 7 showing the pallet and load in an elevated position and the cart resting on the drive and the stabilizing wheels.

DESCRIPTION OF THE EMBODIMENTS OF THE INVENTION

Figure 10:
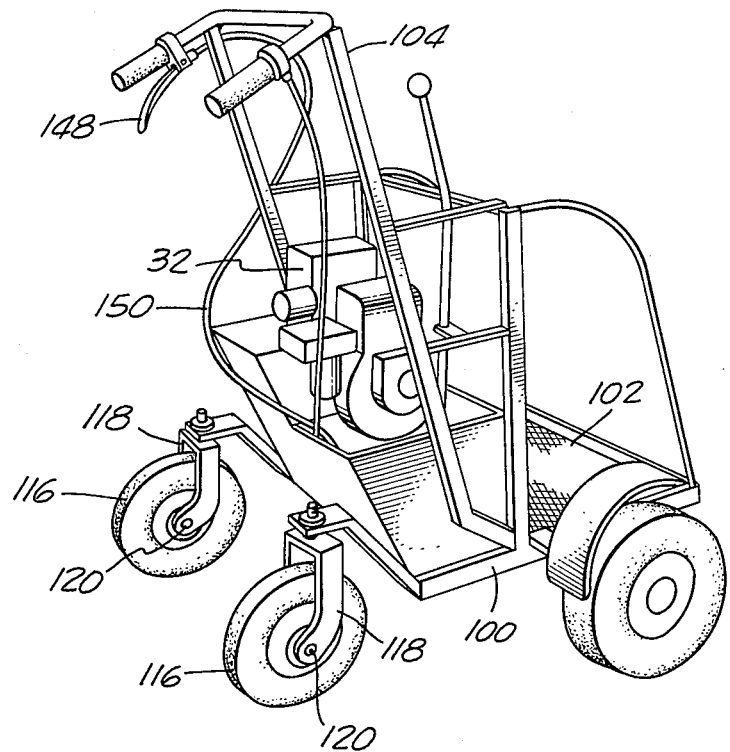
FIG. 10 is a generally perspective view of another embodiment of the present invention.

Referring to the drawings and particularly to FIGS. 1 and 2, one form of the motorized cart of the invention is illustrated and generally designated by the numeral 12. The major components of the motorized cart of this form of the invention comprise a base frame 14, a load carrying platform 16 mounted on the base frame, roller means carried by the base frame for rollably supporting the base frame and load bearing platform while the cart and its load is being moved from place to place, driving means for propelling the cart and upstanding handle means 18 for guiding the path of travel of the cart.

Forming an important part of the roller means of the invention is a differential means which is driven by the driving means and which performs the important function of permitting the drive wheels of the device to rotate at different rates of speed. Turning to FIG. 3, the differential means is provided in this form of the invention as a differential gear assembly generally designated by the numeral 20. A first axle 22 is connected to differential gear 20 and is drivable thereby at a rate of speed. Axle 22 extends transversely of the base frame and is rotatably supported by bearings 24 which are affixed to the base frame. A second axle 26 is connected to differential gear 20 and is drivable thereby at a rate of speed. A first drive wheel 28 is connected at the outboard end of axle 22 and a second drive wheel 30 is connected at the outboard end of axle 26.

The major elements of the driving means of the present form of the invention comprise a motor 32, carried by the base frame rearwardly of the transverse axis of axles 22 and 26 and connecting means for interconnecting motor 32 with the differential gear assembly 20. The connecting means, the component parts of which will presently be discussed, is also mounted rearwardly of the axis of axles 24 and 26.

As best seen by referring to FIGS. 1 and 2, there is provided a third stabilizing wheel 36 which is adapted to engage the ground or other running surface when the motorized cart is in its transport configuration. Stabilizing wheel 36 is rotatably carried by frame 14 and is located rearwardly of motor 32 and the connecting means of the apparatus. In the form of the invention shown in the drawings, stabilizing wheel 36 is rotatably carried by a fork member 38 which is pivotally connected to the base frame at its rearward-most extremity 40. With this construction, stabilizing wheel 36 can rotate about an axle 42 carried by the fork 38 and can also pivot relative to the base frame so as to guide the path of travel of the motorized cart.

The center of gravity of the motorized cart is such that the cart is maintained in a normal first position with the first, second and third, or stabilizing wheel in engagement with the ground or other supporting surface. While the first and second wheels are driven by the differential gear in a manner presently to be described, the third wheel, or stabilizing wheel, is free running. Because of the unique weight distribution of the cart of this form of the invention, it is pivotally movable about the first axis, that is, the axis of the axles 22 and 26 to a second position upon the exertion of an upward force upon handles 18, whereby the forward portion of load carrying platform is moved downwardly, closer to the ground in the manner illustrated in FIG. 7. This feature of the invention facilitates loading of the loading platform with bulky, heavy items such as lug boxes and the like.

An additional feature of the motorized cart of the invention as shown in FIGS. 7, 8 and 9 is the provision of loading forks 44 which are removably receivable in slots 46 formed in the forward portion of the loading platform 16. Loading forks 44 have a first leg portion 44a which is receivable in slots 46, a second perpendicularly extending leg 44b and a third leg 44c which extends generally parallel to leg 44a. As illustrated in FIG. 7, leg 44c of forks 44 is adapted to be received beneath a load carrying pallet 48 when the motorized cart is forwardly tilted into its second position. As shown in FIG. 9, when the motorized cart is permitted to return to its normal running position, the weight of the engine and driving gear counterbalances the load carried on the pallet causing the pallet and the load to be elevated in the manner shown in FIG. 9.

Referring again to FIGS. 2 and 3, the connecting means of the embodiment of the invention thereshown comprises a rotatable shaft 50 carried in bearings 52 which bearings are supported by the base frame 14; a pulley 54 mounted on shaft 50 and rotatable therewith; a first drive member in the form of a drive belt 56 interconnecting motor 32 and pulley 54; a driving element 58 mounted on the outboard extremity of shaft 50 and rotatable therewith; a driven element 60 mounted on the inboard side of differential assembly 20; and a second drive member 62 interconnecting driving and driven gears 58 and 60, respectively. With this arrangement, when motor 32 is running and belt 56 drivably interconnects motor 32 and pulley 54, rotation of the motor will cause rotation of shaft 50 and driving element 58. When driving element 58 is connected with driven element 60 by drive member 62 which may be in the form of a chain or belt, differential gear assembly 20 will be caused to rotate.

Referring to FIG. 4, the internal construction of the differential gear 20 is illustrated. As is apparent from an examination of FIG. 4, the construction of the differential assembly is conventional, comprising an outer housing 64, a pair of bevel wheels 66, interconnected with axles 22 and 26, and a pair of differential pinions 68 operably associated with bevel wheels 66. Differential pinions 68 rotate about an axle member 70 supported within the differential housing 64 (see FIG. 5). The bevel wheels are removably interconnected with the axle by means of a split ring 71.

When the motorized cart is traveling straight ahead under driving power from motor 32, the differential gear assembly 20 rotates but the differential pinions 68 will not rotate on their shafts. They drive bevel wheels 66 which are rigidly connected to the inner ends of the axles 22 and 26 respectively which now rotate at the same speed. However, when the motorized vehicle is traveling in a bend, or over rough terrain, one of the axles 22 or 26 may rotate at a slower speed than the other. In this instance, the differential pinions will rotate on their respective shaft with the result that they retard the bevel wheel of the slower rotating axle and at the same time accelerate the bevel wheel affixed to the faster moving axle. As previously stated, the differential assembly of the invention is of standard construction and operates in a standard fashion.

Referring to FIGS. 2, 3 and 6, the form of the invention there illustrated also includes a clutch means associated with the first drive member, or belt 56, for moving the belt into and out of engagement with pulley 54. This clutch means comprises a plate 74 which is rotatably carried by handle 18; an idler roller 76 rotatably carried on shaft 78 which is connected to plate 74 and extends inwardly toward motor 32 in close proximity with belt 56; and an actuating lever assembly 80 carried by the handle 18. Lever assembly 80 comprises first and second portions 80a and 80b. Portion 80a is interconnected proximate one end to plate 74 and is pivotally interconnected proximate its other end to second portion 80b intermediate the ends thereof. Portion 80b is pivotally connected at one end to handle 18 and is provided at its opposite end with a hand grip portion 80c. As best seen by referring to FIGS. 2 and 6, lever assembly 80 is manually movable from a first position shown in FIG. 2 to a second position shown in FIG. 6. Such movement of lever 80 causes counterclockwise rotation of plate 74 which in turn causes idler roller 76 to move into pressural engagement with belt 56. This movement of the idler roller causes belt 56 to move into pressural driving engagement with pulley 54 in the manner shown in FIG. 6.

Also provided in the form of the invention shown in FIGS. 1 through 9 is a brake means associated with the differential means or differential gear assembly 20 for controllably impeding rotation of the first and second wheels 28 and 30. Referring particularly to FIG. 1 and 3, the brake means of this form of the invention comprises a caliper assembly 84 having movable brake pads 86 and 88 disposed on opposite sides of a plate 90 which is affixed to the differential gear assembly on the side opposite thereof from dirven plate 60. Provided on one side of handle 18 is a lever type, hand operated brake assembly 92 which is interconnected with caliper assembly 84 by a flexible wire 94. Squeezing on brake assembly 92 results in movement of wire 94 in a manner as to cause the brake pads 86 and 88 of caliper 84 to move into pressural engagement with plate 90. Engagement of plate 90 by brake pads 86 and 88 tend to retard its rate of rotation and, accordingly, retard the rate of rotation of wheels 28 and 30.

Figure 11:
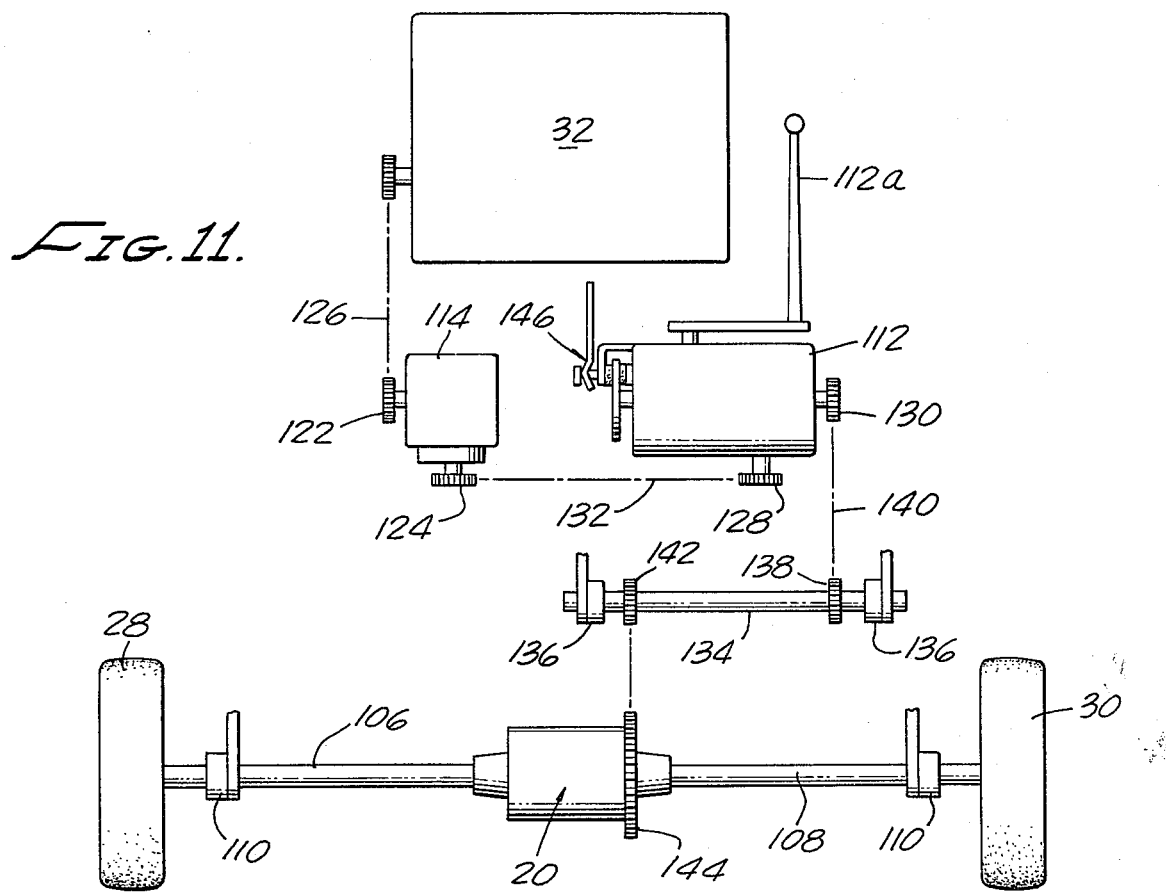
FIG. 11 is a generally diagrammatical view illustrating the relative position of the driving means and differential gear of this alternate form of the invention.

Turning now to FIGS. 10 and 11, there is shown another embodiment of the motorized cart of the present invention. This embodiment of the invention is similar in many respects to the embodiment shown in FIGS. 1 through 9 and like numerals will be used to identify like component parts.

Among the differences between the embodiments shown in the drawings is the provision in the embodiment of FIGS. 10 and 11 of a five speed transmission. This form of the invention also includes a pair of rear, or third stabilizing wheels rather than a single, pivotally mounted rear wheel.

As best seen in FIG. 10, the major components of the motorized cart of this second form of the invention comprise a base frame 100, a load carrying platform 102 mounted on the base frame, roller means carried by the base frame for rollably supporting the base frame and load bearing platform while the cart and its load is being moved from place to place, driving means for propelling the cart and upstanding handle means 104 for guiding the path of travel of the cart.

Forming an important part of the roller means of the invention is a differential means which is driven by the driving means and which performs the important function of permitting the drive wheel of the device to rotate at different rates of speed. The differential means provided in this form of the invention includes a differential gear assembly which is virtually identical to the assembly shown in FIGS. 4 and 5 and generally designated therein by the numeral 20. A first transversely extending axle 106 is connected to differential gear 20 and is drivably thereby at a rate of speed. A second transversely extending axle 108 is also connected to differential gear 20 and is drivable thereby at a rate of speed. A first drive wheel 28 is connected at the outboard end of axle 106 and a second drive wheel 30 is connected at the outboard end of axle 108. Axles 106 and 108 are rotatably supported by bearings 110 mounted on base frame 100.

The major elements of the driving means of this second form of the invention comprise a motor 32, carried by the base frame rearwardly of the transverse axis of axles 106 and 108, a transmission 112, a gear reduction assembly 114 and interconnecting means for interconnecting the transmission with the differential gear assembly 20. The connecting means, the component parts of which will presently be discussed, is also mounted rearwardly of the axis of axles 106 and 108.

As best seen by referring to FIG. 10, there is provided a pair of third stabilizing wheels 116 which are adapted to engage the ground or other running surface when the motorized cart is in its transport configuration. The stabilizing wheels are rotatably carried by frame 100 and are located rearwardly of motor 32 and the driving means of the apparatus. Each of the stabilizing wheels is rotatably carried by a fork member 118 which is pivotally connected to the base frame. With this construction, the stabilizing wheels can rotate about axles 120 carried by the forks 118 and can also pivot relative to the base frame so as to guide the path of travel of the motorized cart.

The center of gravity of the motorized cart is such that the cart is maintained in a normal first position with the first, second and third, or stabilizing wheels in engagement with the ground or other supporting surface. While the first and second wheels are driven by the differential gear in a manner presently to be described, the third, or stabilizing wheels are free running.

Referring again to FIG. 11 the driving means of the second embodiment of the invention for driving the differential gear comprises motor 32, gear reduction assembly 114 which includes a driven gear 122 and a driving gear 124 and a belt 126 interconnecting motor 32 and driven gear 122. The driving means further comprises transmission 112 which includes a driven gear 128 and a driving gear 130, a belt 132 interconnecting driving gear 124 and driven gear 128 and interconnecting means for operably interconnecting driving gear 130 of the transmission and the differential gear 20.

In the form of the invention shown in FIG. 11, the interconnecting means comprises a stub shaft 134 which is rotatably supported in bearings 136 carried by base frame 100. Provided on shaft 134 is a driven gear 138 which is interconnected with driving wheel 130 by a belt 140 and a driving gear 142 which is adapted to drive a gear 44 affixed to a differential gear assembly 20.

With the arrangement shown in FIG. 11, when motor 32 is running and belt 126 drivably interconnects motor 32 and gear 122 of gear reduction assembly 114, rotation of the motor will cause rotation of driving element 124 at a predetermined rate of speed. When the appropriate speed of the five speed transmission 112 has been selected by movement of the gear shift handle 112a and when driving element 124 is connected with the transmission by belt 132, the stub shaft 134 and, in turn, the differential gear assembly 20 will be caused to rotate at a predetermined rate of speed. Rotation of the gear assembly will the cause rotation of the wheels 28 and 30 in the manner previously described herein.

The brake means of this second form of the invention is somewhat similar to that provided in the earlier described embodiment save that the caliper assembly 146 (FIG. 11) when actuated by the hand grip 148 (FIG. 10), acts upon the transmission, rather that the differential gear to impede the rotation of drive gear 130. The hand grip 148 is interconnected with the caliper assembly in a standard manner by a cable 150 (FIG. 10).

The second form of the invention as shown in FIGS. 10 and 11 is somewhat more complicated than the first form of the invention illustrated in FIGS. 1 through 9. However, the addition of the five speed transmission has significant advantages for certain applications and permits precise speed and traction control by the operator while still retaining the advantages of the differential means provided in the first embodiment of the invention.

Having now described the invention in detail in accordance with the requirements of the patent statues, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A motorized cart comprising:
(a) a base frame;
(b) a load carrying platform mounted on said base frame;
(c) roller means carried by said base frame for rollably supporting said base frame and said load carrying platform while the cart and its load is being moved from place to place, said roller means comprising:
    (1) a transversely extending axle carried by said base frame, said axle having a transversely extending first axis;
    (2) a pair of transversely spaced apart first and second wheels rotatable about said first axis;
    (3) at least one third wheel rollably carried by said base frame rearwardly of said first and second wheels, said third wheel being rotatable about a second axis longitudinally rearwardly spaced apart from said first axis; and
    (4) a differential means drivably interconnected with said first and second wheels and adapted to permit said first and second wheels to rotate at different speeds;
(d) driving means for driving said pair of transversely spaced apart wheels, said driving means comprising:
    (1) a motor carried by said base frame;
    (2) connecting means for interconnecting said motor and said differential means to drive said first and second wheels; and
(e) upstanding handle means for guiding the path of travel of the cart.

2. A motorized cart as defined in claim 1 including brake means associated with said differential means for impeding rotation of said second wheels.

3. A motorized cart as defined in claim 1 in which said connecting means comprises:
(a) a rotatable shaft carried by said base frame and disposed intermediate said motor and said differential means;
(b) a pulley mounted on said shaft and rotatable therewith;
(c) a first drive member interconnecting said motor and said pulley;
(d) a driving element mounted on said shaft and rotatable therewith;
(e) a driven element mounted on said differential means; and
(f) a second drive member, interconnecting said driving and said driven gears.

4. A motorized cart as defined in claim 3 including clutch means associated with said first drive member for moving said first drive member into and out of driving engagement with said pulley.

5. A motorized cart as defined in claim 4 in which said clutch means comprises:
(a) a plate rotatably carried by said handle means;
(b) an idler roller rotatably carried by said plate in close proximity with said first drive member;
(c) an actuating lever carried by said handle means and interconnected proximate one end to said plate, said lever being movable from a first position to a second position to rotate said plate whereby said idler roller is moved into pressural engagement with said first drive member.

6. A motorized cart as defined in claim 1 in which the center of gravity of the cart is such that the cart is maintained in a normal first position with said first, second and third wheels in engagement with the ground or other supporting surface, said third wheel being free running, said cart being pivotally movable about said first axis to a second position upon the exertion of an upward force upon said handle means whereby the forward portion of said load carrying platform is moved downwardly.

7. A motorized cart as defined in claim 6 including fork means removably connected to said load carrying platform for insertion beneath a load carrying pallet when said cart is in said second position.

8. A motorized cart comprising:
(a) a base frame;
(b) a load carrying platform mounted on said base frame;

(c) transversely extending axle carried by said base frame, said axle having a transversely extending first axis;
(d) a pair of transversely spaced apart first and second wheels rotatable about said first axis;
(e) at least one third wheel rollably carried by said base frame rearwardly of said first and second wheels, said third wheel being rotatable about a second axis longitudinally rearwardly spaced apart from said first axis;
(f) a differential means drivably interconnected with said first and second wheels and adapted to permit said first and second wheels to rotate at different rates of speed;
(g) a motor carried by said base frame;
(h) connecting means for interconnecting said motor and said differential means to drive said first and second wheels said connecting means comprising:
  (1) a rotatable shaft carried by said base frame and disposed intermediate said motor and said differential means;
  (2) a pulley mounted on said shaft and rotatable therewith; p1 (3) a first drive member interconnecting said motor and said pulley;
  (4) a driving element mounted on said shaft and rotatable therewith;
  (5) a driven element mounted on said differential means; and
  (6) a second drive member, interconnecting said driving and said driven gears;
(i) upstanding handle means for guiding the path of travel of the cart;
(j) clutch means associated with said first drive member for moving said first drive member into and out of driving engagement with said pulley, said clutch means comprising:
  (1) a plate rotatably carried by said handle means;
  (2) an idler roller rotatably carried by said plate in close proximity with said first drive member;
  (3) an actuating lever carried by said handle means and interconnected proximate one end to said plate, said lever being movable from a first position to a second position to rotate said plate whereby said idler roller is moved into pressural engagement with said first drive member.

9. A motorized cart as defined in claim 8 including fork means removably connected to said load carrying platform for insertion beneath a load carrying pallet when said cart is moved into a second position by pivoting said base frame about said first axis.

* * * * *